United States Patent [19]

Sander et al.

[11] Patent Number: 4,991,947
[45] Date of Patent: Feb. 12, 1991

[54] TWO OPTOMECHANICALLY COUPLED SURGICAL MICROSCOPES WITH COAXIAL ILLUMINATION

[75] Inventors: Ulrich Sander, Oberkochen; Ulrich Lemke, Oggenhausen; Albrecht Vogel, Oberkochen, all of Fed. Rep. of Germany

[73] Assignee: Carl-Zeiss-Stiftung, Heidenheim/Brenz, Fed. Rep. of Germany

[21] Appl. No.: 416,047

[22] Filed: Oct. 2, 1989

[30] Foreign Application Priority Data

Oct. 5, 1988 [DE] Fed. Rep. of Germany ....... 3833876

[51] Int. Cl.⁵ .................. G02B 21/00; G02B 5/04
[52] U.S. Cl. .................. 350/507; 350/511; 350/527; 350/286
[58] Field of Search ............... 350/516, 523, 507, 508, 350/511, 514, 515, 517, 527, 528, 133, 138, 286, 287

[56] References Cited

U.S. PATENT DOCUMENTS

| 4,688,907 | 8/1987 | Kleinberg | 350/539 |
| 4,763,968 | 8/1988 | Minami et al. | 350/516 |
| 4,779,968 | 10/1988 | Sander | 350/527 |
| 4,802,749 | 2/1989 | Togino et al. | 350/502 |

FOREIGN PATENT DOCUMENTS 1083065 1/1955 Fed. Rep. of Germany.
2146789 4/1985 United Kingdom.

Primary Examiner—Bruce Y. Arnold
Assistant Examiner—Thong Nguyen
Attorney, Agent, or Firm—Stonebraker, Shepard & Stephens

[57] ABSTRACT

A microscope having two optomechanically coupled observation barrels to permit simultaneous use by two individuals. While each barrel is provided with its own eyepieces and its own magnification system, they share a common optical axis including a single objective lens and a specially designed composite prism which allows part of the observation beam (the light reflected by the object) to pass through it, undiminished, to one of the observation barrels, while the other part of this light is deflected to the other observation barrel by a mirror layer within the prism. The microscope's illumination beam is directed onto the object field along the same common optical axis followed by the returning observation beam, and this illumination is deflected into this optical axis at a point between the object field and the objective lens.

3 Claims, 2 Drawing Sheets

TWO OPTOMECHANICALLY COUPLED SURGICAL MICROSCOPES WITH COAXIAL ILLUMINATION

BACKGROUND

This invention concerns surgical microscopes having two optomechanically coupled observation barrels at least one of which is arranged to be relatively rotatable about the optical axis of the other. Each observation barrel is provided with its own respective magnification system, while both share a common observation path to the object field through an optical beam splitter.

Such microscopes are needed in modern surgery to permit two surgeons to observe simultaneously the same field of vision under the same angle of view. Preferably, the second observation barrel should be appropriately oriented 90° offset from the first, being positionable selectively to either the right or to the left of the barrel being used by the principal surgeon.

For many demanding surgical techniques, it is necessary that the microscope's illumination beam be directed along an axis as nearly coincident as possible with the axis of the reflected observation beam, and one known arrangement of optomechanically coupled surgical microscopes for two surgeons does provide such coaxially-directed illumination. This arrangement is shown in commonly assigned British Patent No. 2 146 789 A. However, each of the two coupled surgical microscopes disclosed in this British reference has its own respective illumination source and its own respective objective lens, and these optical systems are joined below their respective objective lenses through a common optical splitter system. This prior art arrangement results in blooming and interfering light reflections which occur as the illuminating beam passes through one or the other of these respective main lenses.

SUMMARY OF THE INVENTION

The present invention overcomes the disadvantages of the prior art with an arrangement in which the two observation barrels, while retaining respective individual magnification systems, share an objective lens located in the common observation path below the individual barrels. This shared objective lens is positioned between the object field and a special composite prism which splits the radiation reflected from the object being viewed to direct it along the individual optical axes of the respective observation barrels. Further, the beam of light used to illuminate the object is directed onto the object field through a partially translucent deflection element which is located between the object field and the shared objective lens. That is, the illuminating beam is deflected into the path of and along the common optical axis at a point below both the objective lens and the splitter system, and so it does not pass through either. This arrangement obviates the problems created by unwanted reflections of the illuminating radiation while, at the same time, directing the illuminating beam onto the object along an axis coincident with the observation axis.

In a preferred embodiment of the invention, the special composite prism used as the splitter has an interface extending obliquely to the base. A spectacle-shaped mirror layer is applied to the interface and positioned to deflect a portion of the light reflected from the object being viewed into one of the observation barrels while allowing the undeflected portion to pass undiminished into the other observation barrel.

As indicated above, the illuminating beam is introduced through a translucent deflection element, and a preferred embodiment of the invention also includes a light trap in proximity to that deflection element to reduce unwanted reflections of the illuminating beam from the interior surfaces of the microscope housing.

DRAWINGS

DETAILED DESCRIPTION

Figure 1:
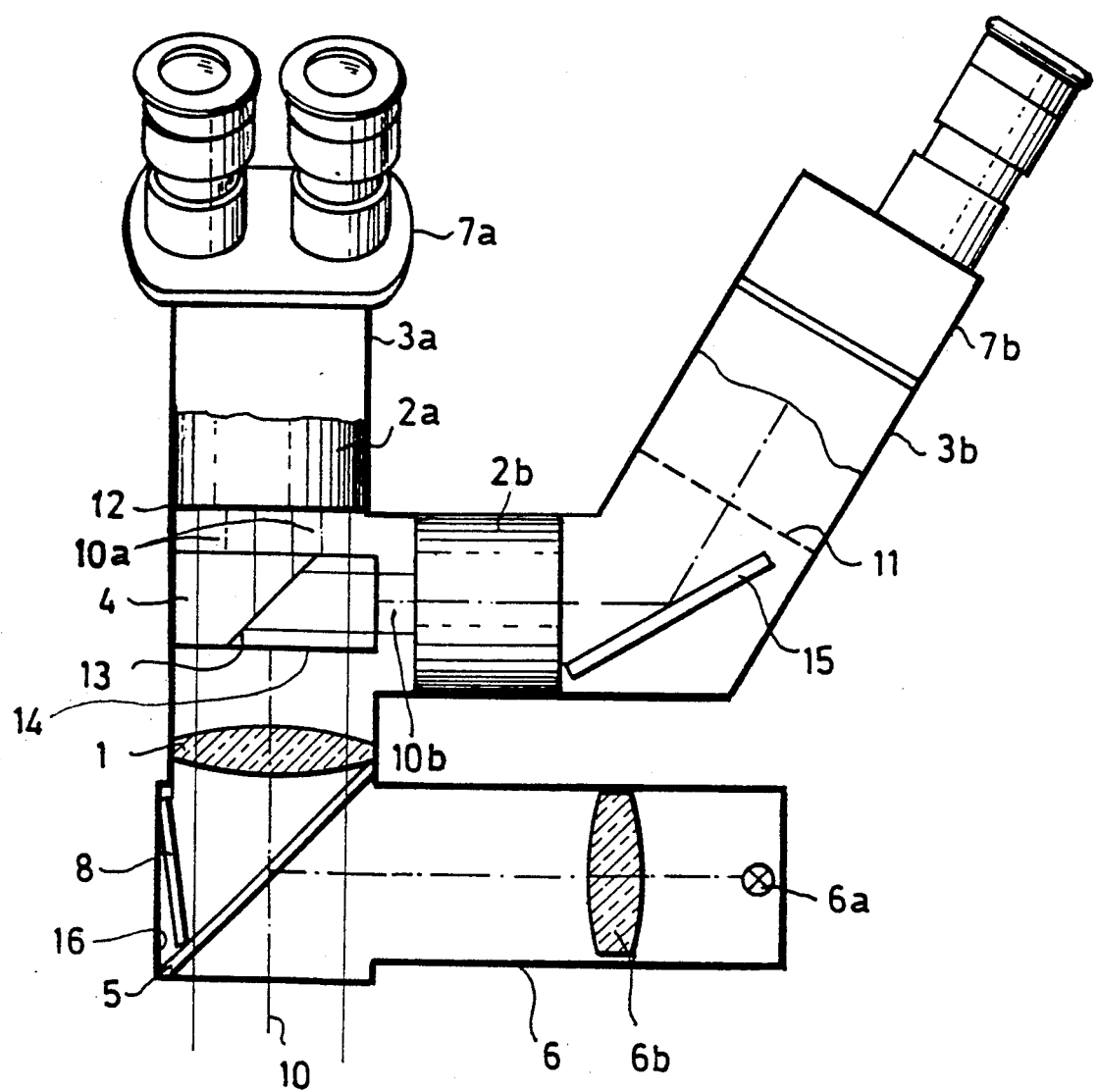
FIG. 1 is a schematic diagram of a microscope according to the invention.

Referring to FIG. 1, the illustrated microscope has an optical axis 10 along which is positioned an objective lens 1. A first observation barrel 3a is aligned with optical axis 10 and includes its own set of binocular axes 10a, eyepiece barrels 7a, and its own binocular magnification system 2a.

A second observation barrel 3b is aligned along a second optical axis 10b and includes, respectively, its own eyepiece barrels 7b and its own magnification system 2b. Barrel 3b is appropriately shaped to accommodate a second viewer, optical axis 10b being conformed to this shape by a deflecting mirror 15.

The upper portion of observation barrel 3b is rotatable about optical axis 10b at an interface 11, while observation barrel 3a is similarly rotatable about optical axis 10 at an interface 12. Thus, second barrel 3b is relatively rotatable about the optical axis of first barrel 3a, and an observer using barrel 3b can be selectively positioned either to the right or the left of the principal viewer using barrel 3a.

The microscope's object field (not shown) is located along common optical axis 10 below objective lens 1 in the manner well known in the art. Positioned between lens 1 and the object field is an illumination unit 6 which includes a bulb or other source of illuminating radiation 6a, a lens 6b, and a translucent deflection element 5.

Since deflection element 5 must be translucent to allow passage of the observation beam (i.e., the illumination reflected from the object being viewed), it is similarly translucent to a significant portion of the illuminating beam emanating from source 6a. Therefore, the interior of the microscope housing would also be illuminated at surface 16, and this illumination would be reflected back into deflection element 5, and from there, it would be further reflected up through objective lens 1, seriously affecting the contrast of the image being viewed. To prevent such unwanted reflections, illuminating unit 6 is provided with a light trap in the form of a filter 8 which absorbs most of the radiation impinging upon it. Filter 8 also has an anti-reflection surface and is appropriately tilted so that any residual reflection is directed in such a manner that it cannot be viewed by objective lens 1.

Figure 2A:
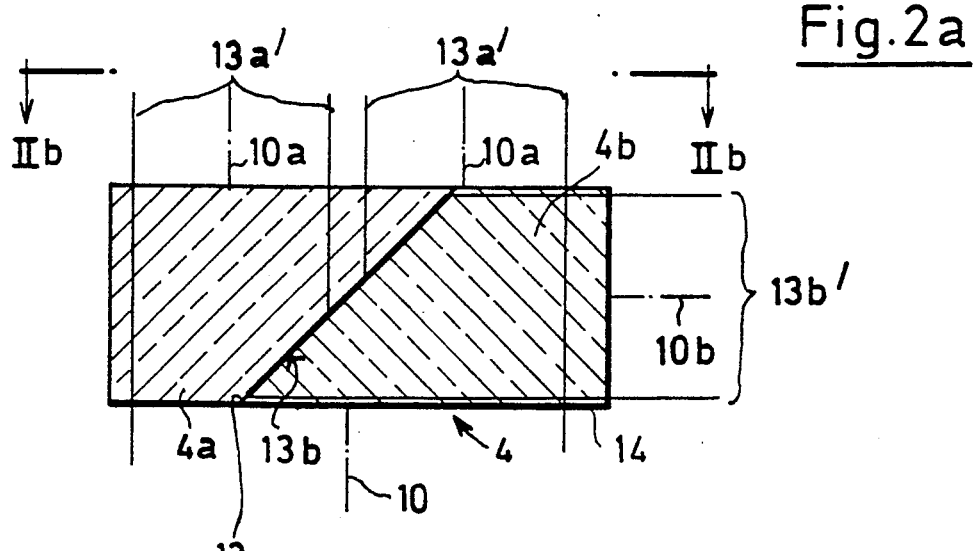
FIGS. 2a and 2b are two views of the special composite prism which splits the observation path of the microscope, FIG. 2a being a sectional view taken along line IIa in FIG. 2b.
Figure 2B:
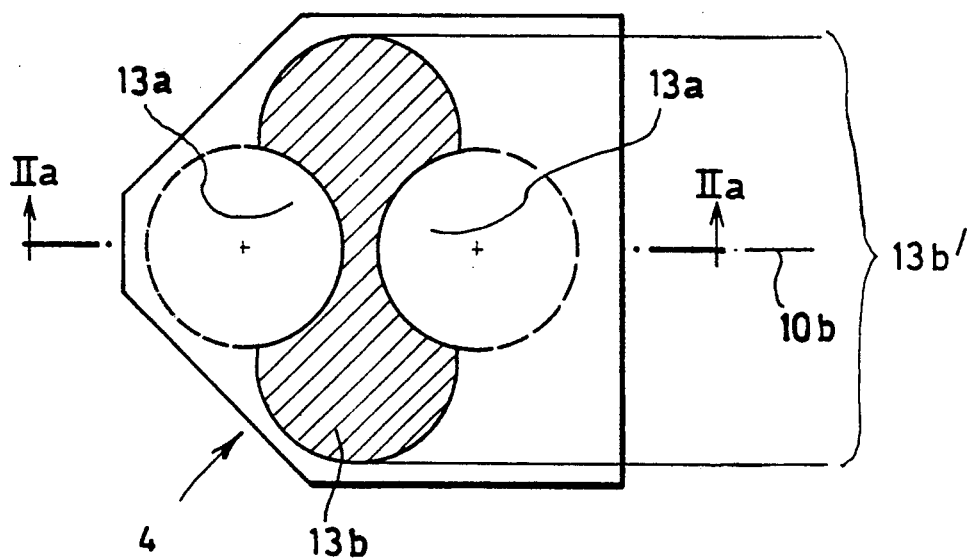

Referring now to FIGS. 2a and 2b, a composite prism 4 is shown enlarged in two views, FIG. 2a being a cross-sectional view of prism 4 taken along the line IIa in FIG. 2b, while FIG. 2b is a top view of prism 4 (i.e., from the direction of the arrows IIb in FIG. 2a). Prism 4 has a parallelepiped shape and is mounted in alignment with, and with its base 14 perpendicular to, common optical axis 10. Prism 4 is comprised of at least two elements 4a, 4b, both of which have matching interface surfaces 13. A partially-reflecting mirror layer 13b is applied to interface surface 13 of element 4a by processes well known in the art.

Special attention is called to the unusual shape of mirror layer 13b which might be characterized as a modified "figure 8 " or, perhaps, as being in the shape of a pair of eyeglasses (i.e., "spectacle-shaped"). This unusual shape is contoured to follow the general outline of the binocular optical passageways of observation barrel 3b as that outline projects onto the surface of mirror layer 13b. By virtue of this unusual shape of mirror layer 13b, significant portions of the binocular observation passage of first observation barrel 3a (identified schematically as passages 13a surrounding binocular axis 10a) remain unobstructed by mirror layer 13b. Therefore, as the observation beam returns from the object field along common axis 10, one portion of the beam is deflected by mirror layer 13b along passage 13b' into observation barrel 3b, while other portions of the beam pass, undiminished, through non-reflective areas 13a, continuing along passages 13a' into observation barrel 3a.

We claim:

1. In a microscope with first and second optomechanically coupled binocular observation barrels, each having its own respective set of binocular optical axes and magnification means, a both barrels receiving radiation from an object field through a splitter means and both sharing a common optical axis between said splitter means and the object field, said splitter means being in the form of a composite prism with a base perpendicular to said common optical axis and an interface with a reflective mirror layer extending obliquely to the base, the improvement wherein said reflective mirror layer is contoured to follow a spectacle-shaped outline of the binocular passageways of one of said observation barrels when said outline is projected onto said obliquely-extending interface, said contoured mirror layer deflecting a portion of the radiation from the object field along the binocular axes of said one observation barrel while permitting other radiation from said object field to pass directly through said interface along the binocular axes of the other observation barrel.

2. The microscope of claim 1, further comprising:
   a single objective lens positioned along said common optical axis between the object field and said splitter means;
   illumination means for directing a beam of radiation onto the object field; and
   partially-reflecting means for reflecting said illuminating beam into the path of and along said common optical axis at a point between the object field and said objective lens.

3. The microscope of claim 2 wherein all radiation illuminating the object field and reflected from the object field impinges on or passes through said partially reflecting means which includes light trap means to minimize reflections of said illuminating radiation.

* * * * *